(12) United States Patent
Burger et al.

(10) Patent No.: US 12,060,774 B2
(45) Date of Patent: Aug. 13, 2024

(54) TUNNEL MACHINE HAVING SEALING UNITS FOR SEALING AN ANNULAR GAP AROUND A DRIVE SHAFT FOR A CUTTING WHEEL

(71) Applicant: HERRENKNECHT AKTIENGESELLSCHAFT, Schwanau (DE)

(72) Inventors: Werner Burger, Schwanau (DE); Gerhard Wehrmeyer, Schwanau (DE); Dietmar Isele, Rheinhausen (DE); Felix Weber, Hohberg (DE)

(73) Assignee: HERRENKNECHT AKTIENGESELLSCHAFT, Schwanau (DE)

( * ) Notice: Subject to any disclaimer, the term of this patent is extended or adjusted under 35 U.S.C. 154(b) by 0 days.

(21) Appl. No.: 18/008,754

(22) PCT Filed: Aug. 17, 2021

(86) PCT No.: PCT/EP2021/072829
§ 371 (c)(1),
(2) Date: Dec. 7, 2022

(87) PCT Pub. No.: WO2022/038132
PCT Pub. Date: Feb. 24, 2022

(65) Prior Publication Data
US 2023/0175319 A1 Jun. 8, 2023

(30) Foreign Application Priority Data
Aug. 19, 2020 (DE) .......................... 202020104813.9

(51) Int. Cl.
*E21B 4/00* (2006.01)
*F16J 15/3216* (2016.01)
*F16J 15/3232* (2016.01)
*F16J 15/3268* (2016.01)

(52) U.S. Cl.
CPC .......... *E21B 4/003* (2013.01); *F16J 15/3216* (2013.01); *F16J 15/3232* (2013.01); *F16J 15/3268* (2013.01)

(58) Field of Classification Search
CPC .... E21B 4/003; F16J 15/3216; F16J 15/3232; F16J 15/3268
See application file for complete search history.

(56) References Cited

U.S. PATENT DOCUMENTS 3,807,513 A * 4/1974 Kern .................... F16J 15/3204
175/107
4,844,255 A 7/1989 Schmitt
(Continued)

FOREIGN PATENT DOCUMENTS

| CN | 101280847 A | * 10/2008 |
| CN | 101280847 A | 10/2008 |
| KR | 200202848 Y1 | 11/2000 |

*Primary Examiner* — Dany E Akakpo
(74) *Attorney, Agent, or Firm* — Tarolli, Sundheim, Covell & Tummino LLP

(57) ABSTRACT

A sealing unit (115) for sealing an annular gap (109) formed between a seal wear ring (106) and a seal carrier (112) has a sealing ring holder (118) which is U-shaped in a receptacle region and which, together with the receptacle region, encloses a fixing region (209) of the sealing ring (121).

18 Claims, 13 Drawing Sheets

(56) References Cited

U.S. PATENT DOCUMENTS

2012/0098209 A1\* 4/2012 Siegfriedsen ........ F16J 15/3232
277/562
2016/0059950 A1 3/2016 Kortelainen et al.
2016/0355196 A1 12/2016 Johansson et al.

\* cited by examiner

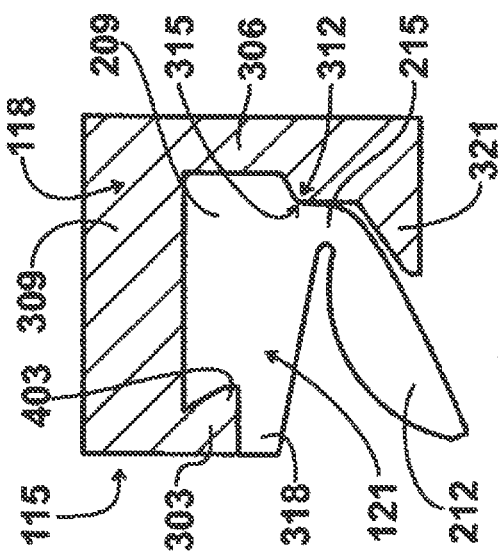
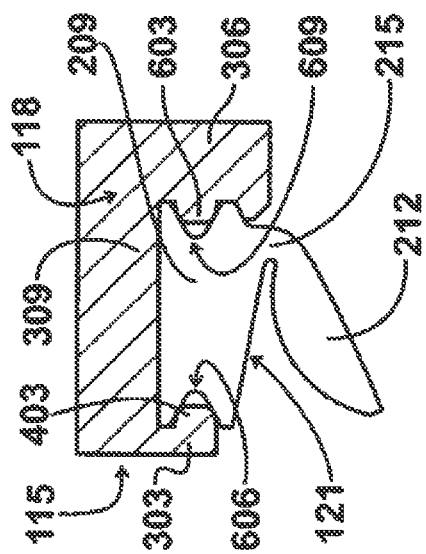
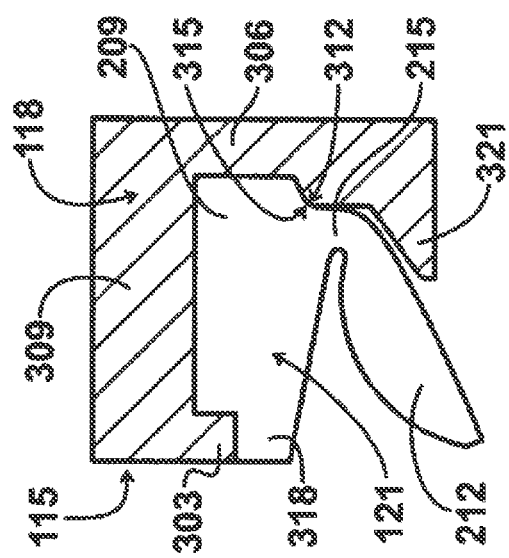
Fig. 3
Fig. 4
Fig. 5
Fig. 6

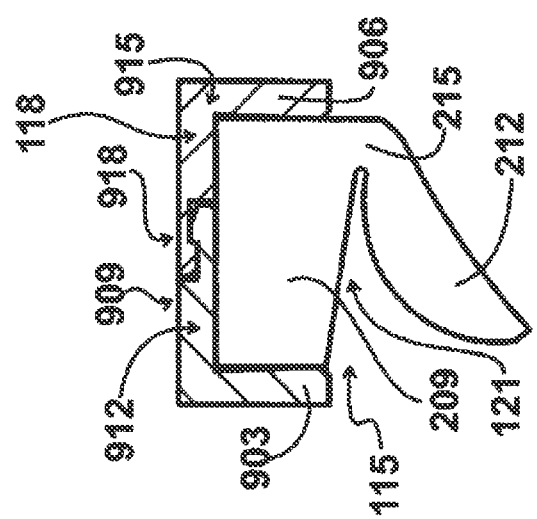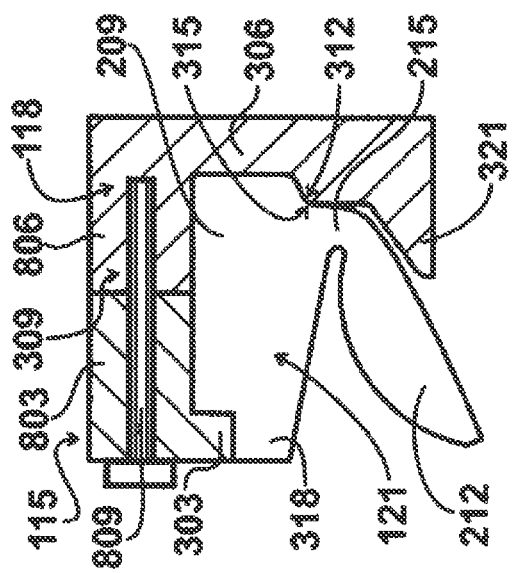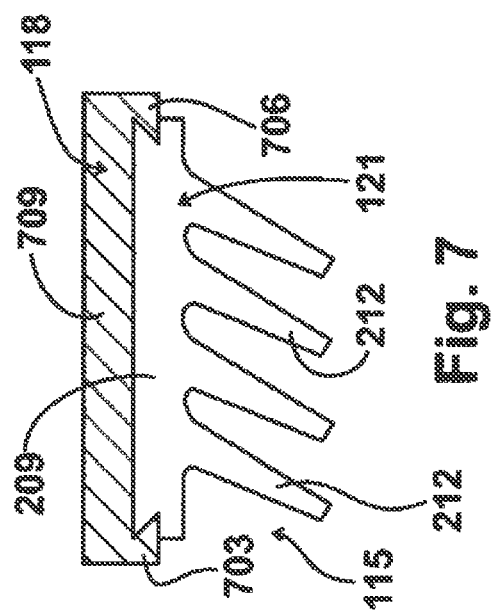

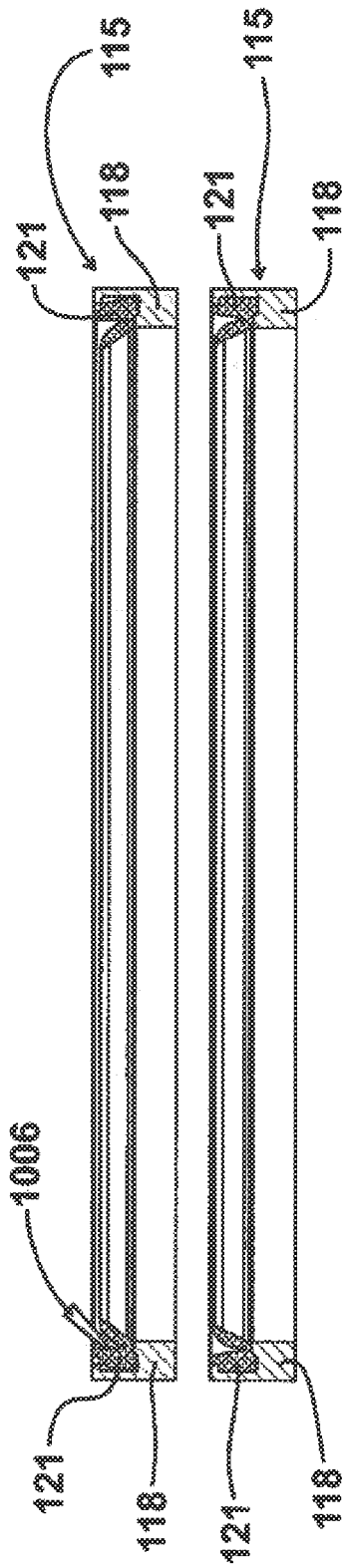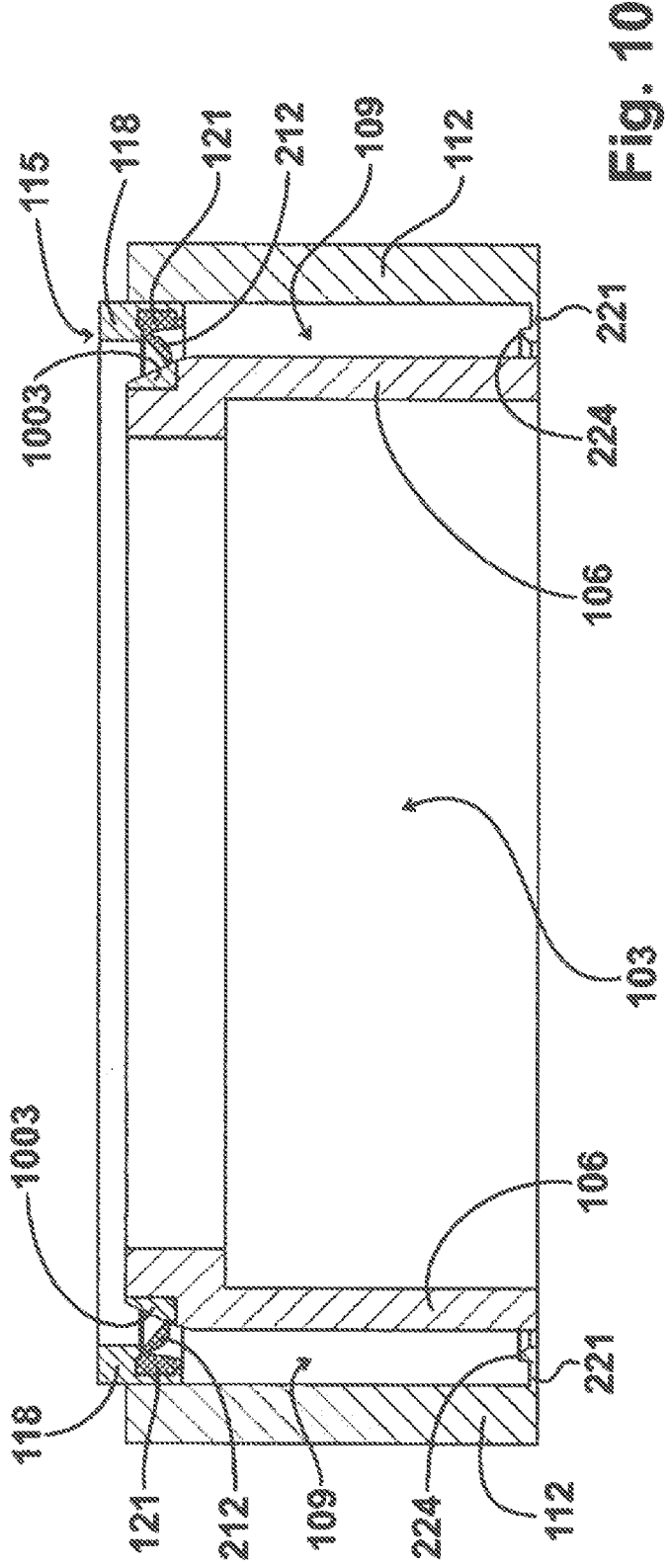
Fig. 10

TUNNEL MACHINE HAVING SEALING UNITS FOR SEALING AN ANNULAR GAP AROUND A DRIVE SHAFT FOR A CUTTING WHEEL

RELATED APPLICATIONS

This application filed under 35 U.S.C § 371 is a national phase application of International Application Number PCT/EP2021/072829, filed Aug. 17, 2021, which claims the benefit of German Application No. 20 2020 104 813.9 filed Aug. 19, 2020, the subject matter of which are incorporated herein by reference in their entirety.

TECHNICAL FIELD

The invention relates to a tunnel boring machine having sealing units for sealing an annular gap around a drive shaft for a cutting wheel.

BACKGROUND

A tunnel boring machine having a number of sealing units for sealing an annular gap around the driveshaft for the cutting wheel is known from CN 101 280 847 A. The sealing rings are arranged in half-open sealing ring holders. In the assembled arrangement of the sealing units, the fixing regions of the sealing rings are fixed in the operating position, on the one hand, by two inside contact surfaces of the sealing ring holder, into which the sealing ring is inserted, and by an annular lug of an adjacent sealing ring holder reaching below the fixing region.

A sealing unit which is provided for single use is known from US 2012/0098209 A1. The sealing unit has a sealing ring holder, which is formed U-shaped in two parts having end sections projecting radially inward, in which a fixing region of a sealing ring is arranged. The sealing ring has a plurality of sealing lips projecting radially inward having various radial extensions for use with stepped shafts.

A support ring arrangement for bearings of railway carriage axles is known from DE 10 2016 208 058 A1, in which an L-shaped sealing ring holder receives a sealing ring and fixes it by means of a spring lug.

A coolant water pump seal for an internal combustion engine is known from U.S. Pat. No. 4,844,255, in which a main seal pressing in a sliding manner against the shaft has a protective seal connected upstream on the coolant water side. The protective seal consists of a filter nonwoven material and is fastened on the housing supporting the main seal.

A sealing unit having a U-shaped sealing ring holder is known from KR 2001 0109702 A, in the receptacle region of which a number of sealing ring discs having interposed spacers is arranged.

A sealing arrangement for a water vehicle is known from US 2016/0059950 A1, which has a number of sealing ring holders, between which sealing rings are arranged. A fixing region of the sealing rings presses with a flat side against a sealing ring holder and an annular lug of an adjacent sealing ring holder reaches below another side thereof opposite to this flat side.

From the technical article "Difficult Ground Solutions (DGS): New TBM Solutions carve a Path to Success" by D. Harding, Proceedings of the World Tunnel Congress 2017—Surface challenges—Underground solutions, Bergen, Norway, a sealing unit having a sealing ring holder made of a rigid material and having a sealing ring made of a flexible material is known, in which the sealing ring is arranged in a half-open recess of the sealing ring holder. The final fixing of the sealing ring by frictional engagement takes place in the installed arrangement by a sealing ring holder of a further sealing unit arranged adjacent to the open side of the sealing ring holder.

A sealing ring holder having a U-shaped receptacle region for solely frictional fixing of a sealing ring is known from EP 2 325 530 B1.

SUMMARY OF THE INVENTION

The invention is based on the object of specifying a tunnel boring machine equipped with a number of sealing units for sealing an annular gap around a drive shaft for a cutting wheel, which are characterized by reliable handling during the installation of the sealing units.

This object is achieved by a tunnel boring machine having the features of claim 1.

Because, in sealing units according to the invention, the sealing ring in the fixing region is enclosed radially and axially on the outside by the sealing ring holder, each of these sealing units can be inserted reliably and in particular without the risk of tilting of the sealing ring into the annular gap.

In one preferred embodiment, the sealing ring is fixed in the sealing ring holder in a formfitting and frictional manner. As a result, a defined form fit and frictional engagement is provided by clipping in the already assembled sealing units. This combination of form fit and friction engagement is present from the pre-assembly of a sealing ring and is maintained during operation.

Further advantageous embodiments of the invention are the subject matter of the dependent claims.

Further expedient embodiments and advantages of the invention result from the following description of exemplary embodiments with reference to the figures of the drawing.

BRIEF DESCRIPTION OF THE DRAWINGS

In the Figures:

FIG. 10 shows, in a sectional view corresponding to FIG. 1, a number of sealing units according to an exemplary embodiment at the beginning of an assembly process.

DETAILED DESCRIPTION

Figure 1:
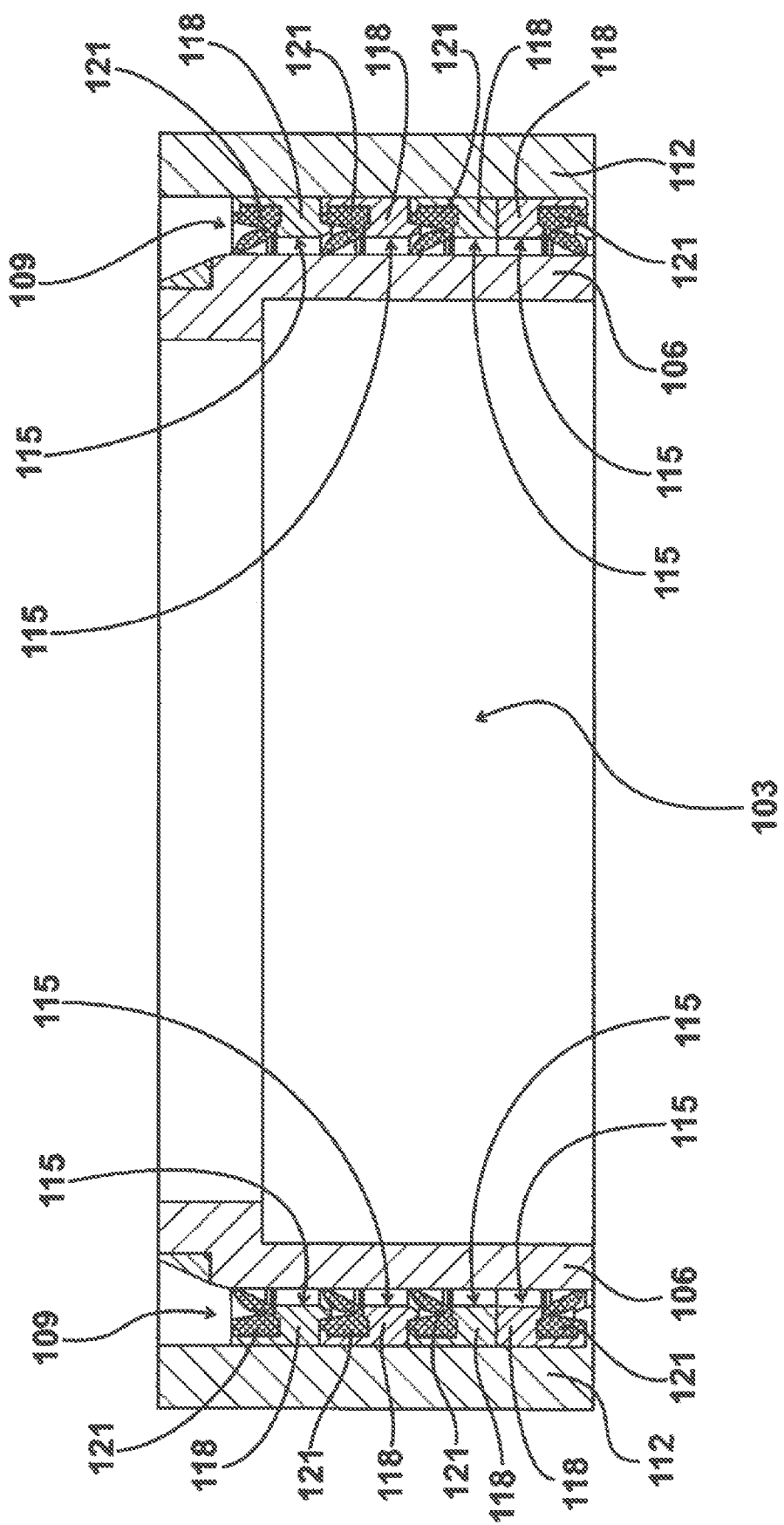
FIG. 1 shows in a sectional view a region around a drive shaft of a tunnel boring machine having a number of sealing units according to one exemplary embodiment.

FIG. 1 shows a sectional view of a region around a drive shaft 103 for a cutting wheel (not shown in FIG. 1) of a tunnel boring machine. Radially on the outside of the drive shaft 103, a seal wear ring 106 is provided, which extends radially on the outside, forming an annular gap 109 extending in an axial direction from axially inside, on the right in the illustration according to FIG. 1, to axially outside, on the left in the illustration, enclosed by a seal carrier 112.

Furthermore, FIG. 1 shows a number of sealing units 115 according to an exemplary embodiment, which are arranged lying against one another in the annular gap 109 in the axial direction after carrying out an assembly process explained in more detail below.

Each sealing unit 115 has as essential components a sealing ring holder 118, which is one-piece in the embodiment shown in FIG. 1 and is formed U-shaped in a receptacle region, and a sealing ring 121 made of a flexible material, which, as explained below on the basis of various embodiments, especially during the assembly process, but also in the intended use, is fixed solely by the associated sealing ring holder 118 by a combination of frictional engagement and form fit so that it cannot tilt.

Figure 2:
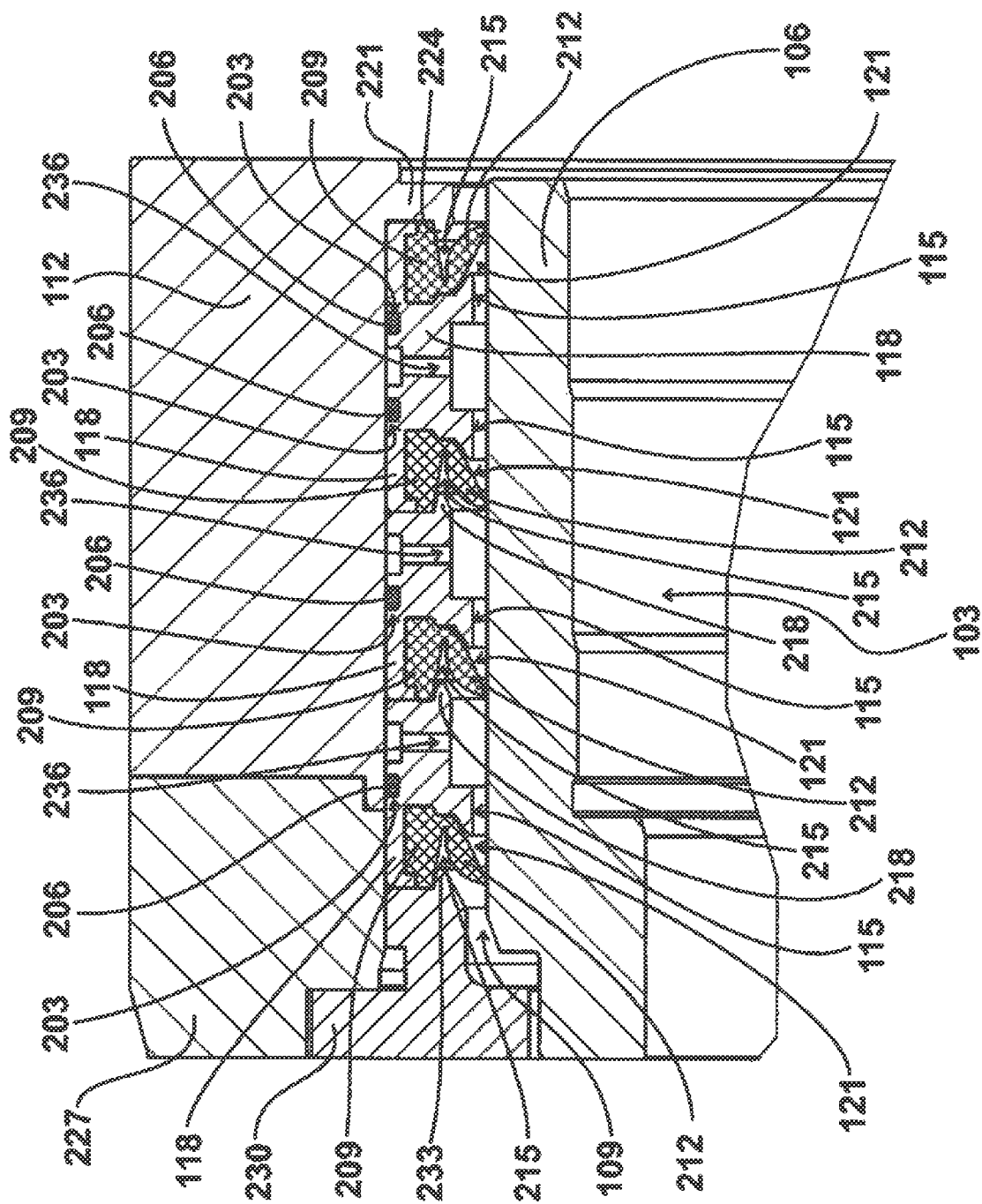
FIG. 2 shows, in a more detailed sectional view than the representation according to FIG. 1, a number of sealing units according to the exemplary embodiment shown in FIG. 1, FIG. 3 to FIG. 9 show different versions of mutually form-fitting interlocking structures formed on sealing ring holders and sealing rings in various designs.

FIG. 2 shows the exemplary embodiment of the sealing unit 115 according to FIG. 1 in a sectional view enlarged in comparison to the representation according to FIG. 1, wherein the sectional planes are positioned differently in FIG. 1 and in FIG. 2. FIG. 2 shows that in the exemplary embodiment shown here, the sealing ring holders 118 have a receptacle groove 203 radially on the outside, in which a ring-shaped outer seal 206 made of a flexible material is formed having a cross section that fills the receptacle groove 203 in the installation situation. The sequence of sealing units 115 is reliably sealed radially on the outside against the seal carrier 112 by the outer seals 206.

Furthermore, it can be seen from the representation according to FIG. 2 that the sealing rings 121 are designed having a comparatively massive fixing region 209 and having a sealing lip 212, wherein the sealing lip 212 is expediently connected to the fixing region 209 via a joint region 215, which has a reduced material thickness in relation to the sealing lip 212.

The fixing region 209 of each sealing ring 121 is arranged in the U-shaped receiving region of the sealing ring holder 118, while the sealing lip 212 expediently presses against the radial outside of the sealing wear ring 106 with a certain pre-tension in the radial direction.

On the side facing away from the sealing ring 121 held by them, the sealing ring holders 118, which are on the inside in the axial direction, expediently have a counter lug 218 that projects axially on the inside and, when arranged as intended in a ring gap 109, shown in FIG. 2, reaches below the fixing region 209 of an adjacent sealing ring 121 and additionally fixes this sealing ring 121 of another sealing unit 115.

The representation according to FIG. 2 also shows that the seal carrier 112 has, on its inner side in the axial direction, a stop ring 221 that protrudes radially inward, which forms an axial stop for the sealing unit 115 that was first inserted during the assembly process, in the representation according to FIG. 2 the rightmost sealing unit 115. A catch lug 224 is formed on the stop ring 221 and engages under the fixing region 209 of the sealing ring 121 pressing against on the stop ring 221 corresponding to the counter lugs 218 for additional fixing.

On the side opposite the stop ring 221 in the representation according to FIG. 2, a closing ring 227 having a locking ring 230 on the radial inside is shown, which axially closes the ring gap 109 while fixing the sealing units 115 inserted into the ring gap 109. A catch lug 233 is also formed on the locking ring 230 and reaches below the fixing region 209 of the sealing ring 121 pressing against the locking ring 230 for additional fixing.

Furthermore, it can be seen from the representation according to FIG. 2 that in each of the sealing ring holders 118, a passage assembly 236 extending in the radial direction is formed, which, depending on its final position after completion of the assembly process, is a chamber having supplied grease or corresponding media in an arrangement in the representation according to FIG. 2 on the left side, a chamber for oil or corresponding media for lubricating the sealing lips 212 in the arrangement in the representation according to FIG. 2 in the middle, and finally a chamber for accommodating dirt and media residues from the other chambers in case of a leak in the arrangement on the right side in the representation according to FIG. 2.

The passage assemblies 236 are also used to supply a pressurized fluid, such as pressurized air, for performing pressure tests, such as checking the closing pressure and/or opening pressure, as explained in more detail below.

The representation according to FIG. 2 shows that in the installed arrangement of the sealing units 115, the flow of force between the seal carrier 112 and the locking ring 230 takes place via the sealing ring holders 118 pressing against one another in the axial direction, so that due to the displaceability of the sealing ring holders 118 in the axial direction, which takes place substantially free of friction losses, the pre-tension forces are distributed uniformly over the sealing ring holders 118. Furthermore, each sealing ring holder 118 absorbs the loads exerted on the sealing ring 121 it holds, so that the sealing rings 121 are subjected to comparatively little load in their fixing region 209.

FIG. 3 shows the exemplary embodiment of a sealing unit 115 according to FIG. 1 and FIG. 2 in the region of the U-shaped receptacle region of the sealing ring holder 118. In the exemplary embodiment according to FIG. 3, the receptacle region is formed by a short side wall 303 and a long side wall 306, which lie opposite to one another, and by a top wall 309, which extends between ends of the side walls 303, 306 lying radially on the outside. A shoulder 312 protruding in the axial direction is formed on the long side wall 306 at an axial distance from the top wall 309 and engages in a depression 315 formed complementary thereto in the fixing region 209 of the sealing ring 121. The shoulder 312 and the depression 315 are components of structures that alternately engage in one another in a form-fitting manner on the sealing ring holder 118 and the fixing region 209.

Further structures of this type are formed by the end of the short side wall 303 protruding radially on the inside and a closing ring 318 of the fixing region 209 pressing against this end.

For the particularly reliable fixing of the fixing region 209 in sealing ring holder 118, it is expedient for the fixing region 209 to have a certain excess compared to the dimensions of the receptacle region in the relaxed state, so that when the fixing region 209 is inserted into the receptacle region, a certain amount of pre-tension that improves the fixing in the fixing region 209 is present.

Furthermore, it can be seen from the representation according to FIG. 3 that at the end of the long side wall 303 facing away from the top wall 309, a stop lug 321 protruding in the axial direction beyond the shoulder 312 is formed, against which the sealing lip 212 presses if pressure is applied to the volume formed between the fixing region 209 and the sealing lip 212

FIG. 4 shows a sectional view of a further exemplary embodiment of a sealing unit 115, wherein elements corresponding to one another are provided with the same reference signs in the exemplary embodiment explained with reference to FIG. 3 and in the exemplary embodiment according to FIG. 4 and are not explained in more detail hereinafter. The exemplary embodiment according to FIG. 4 has, in contrast to the exemplary embodiment according to FIG. 3, a catch lug 403 on the short side wall 303 protruding in the axial direction in the direction of the long side wall 306, which engages in a formfitting manner with the fixing region 209 to form a corresponding structure. As a result, the fixation of the fixing region 209 is further improved.

FIG. 5 shows the sectional view of a further exemplary embodiment of a sealing unit 115, wherein elements corresponding to one another are provided with the same reference signs in the exemplary embodiment explained with reference to FIG. 3 and in the exemplary embodiment according to FIG. 5 and are not explained in more detail hereinafter. The exemplary embodiment according to FIG. 5 differs from the exemplary embodiment according to FIG. 3 with respect to the receptacle region and the fixing region 209 in that the long side wall 306 is beveled in the direction of the top wall 309 to form an acute angle between the inner side of the side wall 306 and the inner side of the top wall 309, wherein the fixing region 209 of the exemplary embodiment according to FIG. 5 fills up the receptacle region in a formfitting manner. This improves the protection against unintentional tilting of the fixing region 209 of the sealing ring 121 out of the receptacle region.

FIG. 6 shows a sectional view of a further exemplary embodiment of a sealing unit 115, wherein elements corresponding to one another are provided with the same reference signs in the exemplary embodiment explained with reference to FIG. 3 and in the exemplary embodiment according to FIG. 6 and are not explained in more detail hereinafter. In the exemplary embodiment according to FIG. 6, the long side wall 306 also has a catch lug 603 which is opposite to a catch lug 403 formed on the short side wall 303. The catch lugs 403, 603 engage in lug grooves 606, 609 formed in the fixing region 209 of the sealing ring 121. The fixing region 209 of the sealing ring 121 is fixed very stably in the receptacle region of the sealing ring holder 118 by the structures of catch lugs 403, 603 and lug grooves 606, 609 that alternately interlock in a form-fitting manner.

FIG. 7 shows a sectional view of a further exemplary embodiment of a sealing unit 115, which is formed having a sealing ring holder 118 and having a sealing ring 121 having multiple sealing lips 212, wherein elements corresponding to one another in the exemplary embodiments explained above and in the exemplary embodiment according to FIG. 7 are provided with the same reference signs and are not explained in more detail hereinafter. The sealing ring holder 118 of the exemplary embodiment according to FIG. 7 has two comparatively short side walls 703, 706, which are connected to one another on the radial outside via a top wall 709. The side walls 703, 706 have, at their ends facing away from the top wall 709, claw-like projections pointing towards one another, which engage in the claw grooves formed in the fixing region 209 of the sealing ring 121. By forming the sealing ring 121 with a number of sealing lips 212, which are only spaced apart from one another in the axial direction, a good seal results in spite of the comparatively high rigidity of the sealing lips 212 in the transition region to the fixing region 209. The sealing lips 212 extend tapering obliquely away from the fixing region 209 in the direction of their free ends.

FIG. 8 shows a sectional view of a further exemplary embodiment of a sealing unit 115, wherein elements corresponding to one another are provided with the same reference signs in the exemplary embodiment explained with reference to FIG. 3 and in the exemplary embodiment according to FIG. 8 and are not explained in more detail hereinafter. The exemplary embodiment according to FIG. 8 differs from the exemplary embodiment according to FIG. 3 in that the sealing ring holder 118 is formed in two parts having a first sealing ring holder part 803 and having a second sealing ring holder part 806. The sealing ring holder parts 803, 806 form the top wall 309 in an assembled arrangement and are releasably firmly connected to one another in this region via screw connections 809 as connecting means. As a result, when the screw connections 809 are not yet completely tightened, the fixing region 209 of the sealing ring 121 can be inserted into the receptacle region of the sealing ring holder 118 and finally fixed by tightening the screw connections 809. This embodiment is expediently used when the fixing region 209 has an excess in relation to the receptacle region.

FIG. 9 shows a sectional view of a further exemplary embodiment of a sealing unit 115, in which the two equally long side walls 903, 906 and a top wall 909 connecting the side walls 903, 906 at their ends on the radial outside of a sealing ring holder 118 is formed in two parts having a first sealing ring holder part 912 and having a second sealing ring holder part 915. The sealing ring holder parts 912, 915 are formed having a form-fitting interlocking detent connection 918 as connecting means on their top wall partial sections facing toward one another, wherein the side walls 903, 906 run radially inwards towards one another in a relaxed arrangement of the detent connection 918, so that when inserting the fixing region 209, which is essentially cuboid in cross section, into the receptacle region, the detent connection 918 is pre-tensioned and is permanently locked until the pre-tension is removed.

The combination of fixing both via frictional engagement and via formfitting in the U-shaped receptacle region of the sealing ring holder 118 has a particular, but not exclusive, advantage during operation, particularly with dynamically pulsating pressures in an excavation chamber of a tunnel boring machine. This type of fixation is preferably used in order to keep the production costs low and to provide a reduced assembly effort and disassembly effort. In addition, replacing, maintaining, and repairing a sealing unit 115 or a combination of sealing units 115, as explained in more detail below, can be carried out with the usual effort.

In an embodiment that is not shown, a sealing ring 121 was fixed in a sealing ring holder 118 by material bonding. Such material bonding can be carried out, for example, by adhesively bonding a sealing ring 121 into a sealing ring holder 118 or by vulcanizing a sealing ring 121 in a sealing ring holder 118 made of metal. Such a fixing by material bonding is expedient in particular in the case of continuous high-frequency vibrations during operation of a tunnel boring machine in order to comparatively reliably avoid tilting of sealing rings 121 during operation while accepting relatively higher repair costs.

In a sectional view corresponding to FIG. 1, FIG. 10 shows the arrangement made up of the seal wear ring 106 and the seal carrier 112 with the annular gap 109 formed in between at the beginning of an assembly process of sealing units 115. In the representation according to FIG. 10, a sealing unit 115 is arranged on a wedge-like, widened insertion side of the annular gap 109, the sealing lip 212 of which, which is still set comparatively steeply, rests on a wedge-like insertion aid 1003 that thickens radially outward in the insertion direction. When this sealing unit 115, which is already shown in sections between the sealing wear ring 106 and the seal carrier 112, is inserted further, the sealing lip 212 slides further onto the insertion aid 1003 until it presses against the radial outside of the sealing wear ring 106. The radial outside of the sealing ring holder 118 slides along the radial inside of the seal carrier 112 so that the radial outside of the sealing ring 121 is protected by the sealing ring holder 118 and is therefore not in contact with the seal carrier 112.

The sealing unit 115 shown in FIG. 10, which has already entered the annular gap 109 in sections, is arranged in such a way that the sealing lip 212 points forwards in the direction of insertion, wherein the insertion process is completed as soon as the sealing unit 115 strikes against the stop ring 221 formed with the catch lug 224 for reaching behind the fixing region 209 of the sealing ring 121. Then, after the fixing region 209 of the sealing ring 121 has been inserted into the receptacle region of the sealing ring holder 118, further sealing units 115 are introduced into the annular gap 109, if necessary using an assembly tool 1006 shown very schematically in the representation according to FIG. 10, wherein these further sealing units 115 are arranged so that the sealing lip 212 in question is arranged on the rear in the insertion direction.

After completion of the assembly process, the arrangement according to FIG. 1 is then provided.

Figure 11:
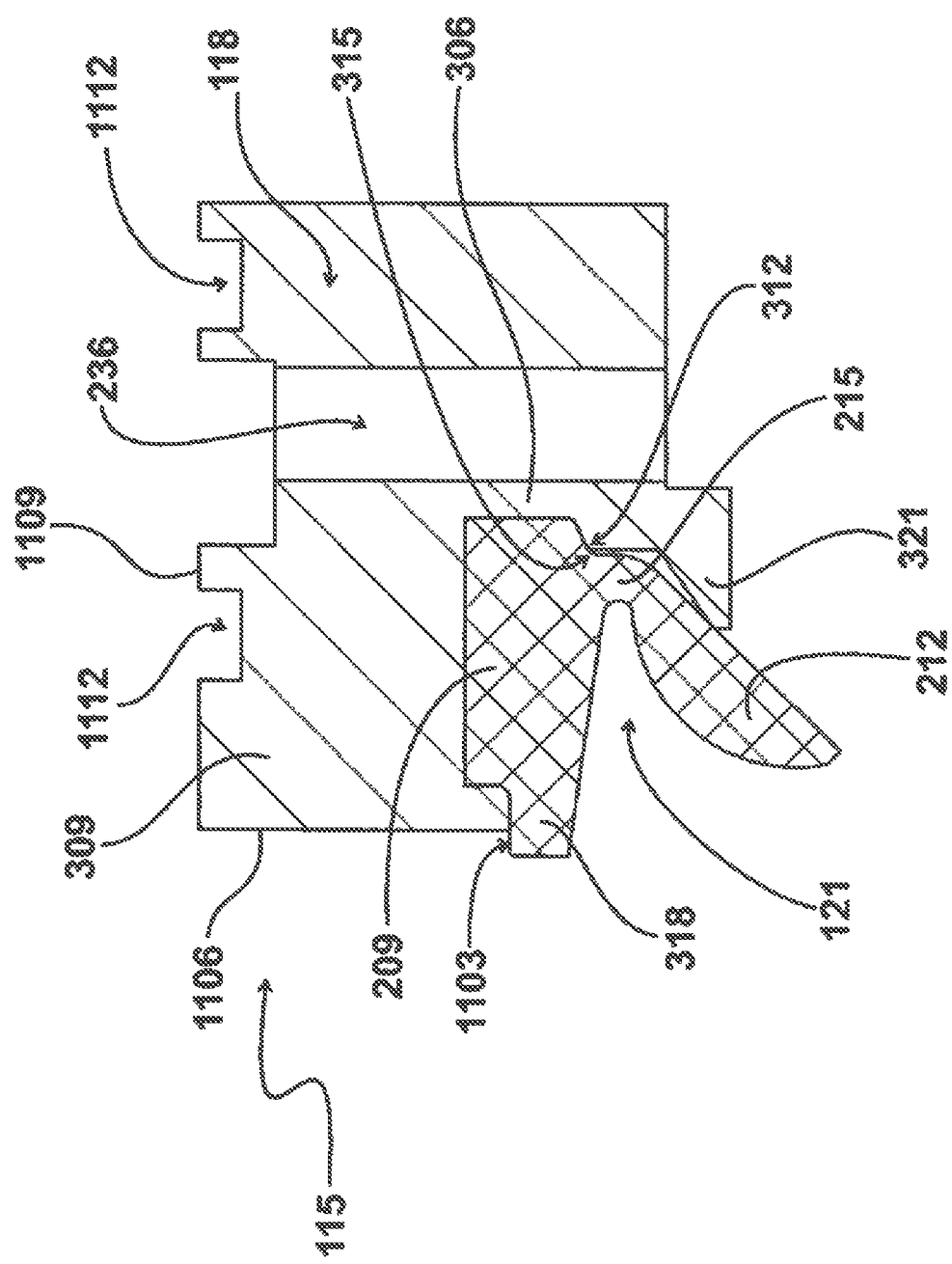
FIG. 11 shows, in a sectional view, a refinement of a sealing unit.

FIG. 11 shows a sectional view of a refinement of the exemplary embodiment of a sealing unit 115 explained with reference to FIG. 3, wherein to avoid repetitions elements corresponding to one another in the exemplary embodiment according to FIG. 3 and the refinement according to FIG. 11 are provided with the same reference signs and are not explained in more detail hereinafter. In the refinement according to FIG. 11, the sealing ring 121 is formed having a closing ring 318 which, in the relaxed state of the sealing ring 121, projects with a projection 1103 beyond an end face 1106 of the top wall 309 facing axially outward. Depending on the elasticity of the sealing ring 121 in the fixing region 209, the dimension of the projection 1103 in the axial direction is configured in such a way that the respective closing ring 118 in the installed arrangement of the sealing units 115 ends flush with the end face 1106, without functionally impairing the form fit of the fixing region 209 with the top wall 309. By forming the projection 1103, adjacent sealing ring holders 118 can thus be sealed off from one another in the radial direction.

Furthermore, the sealing ring holder 118 has a number of outer seal receptacle grooves 1112 on its top side 1109 facing radially outward, into which outer seals 206 (not shown in FIG. 11) are insertable for sealing the sealing ring holder 118 against the seal carrier 112 (not shown in FIG. 11).

Figure 12:
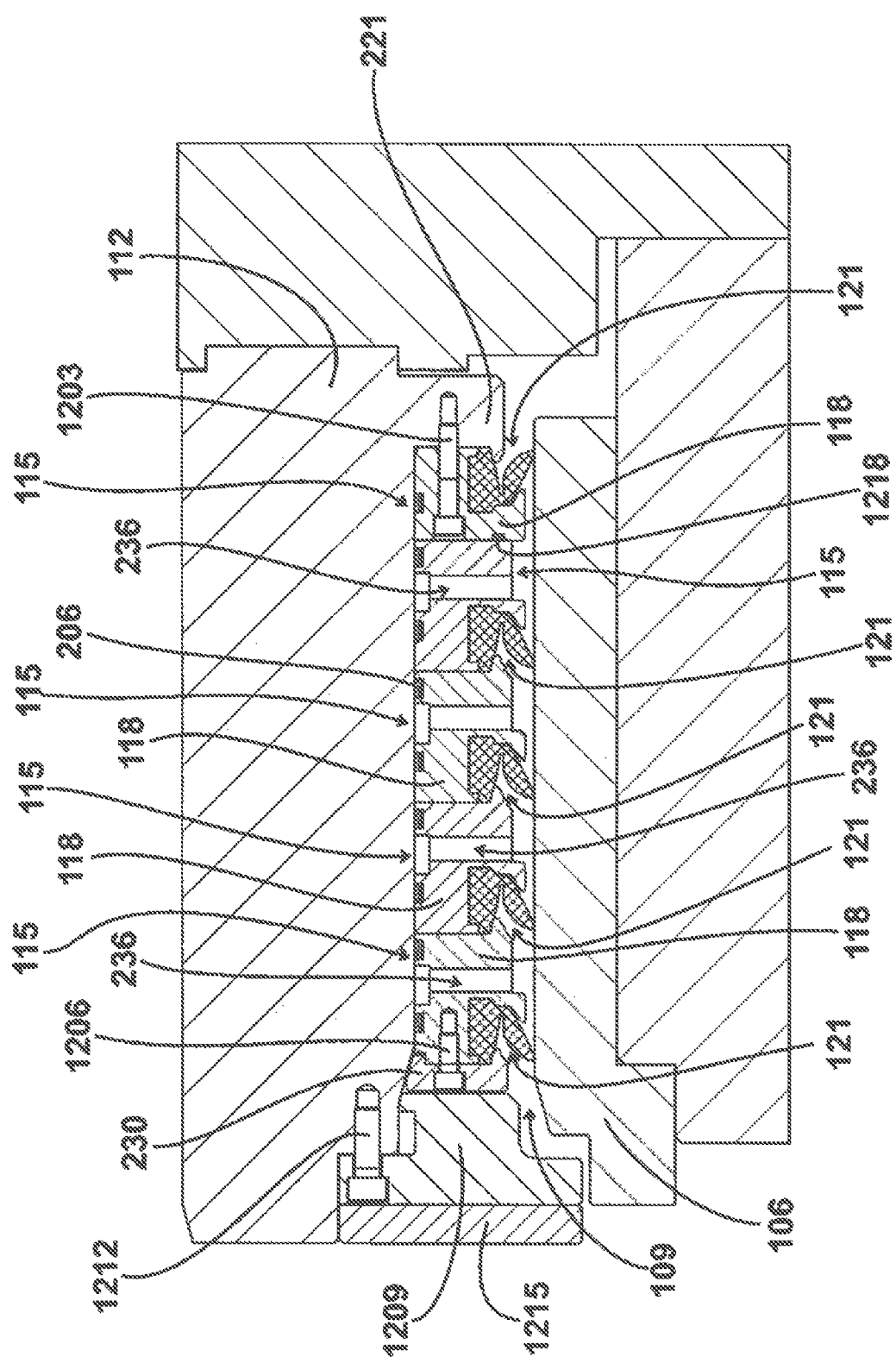
FIG. 12 shows, in a sectional view, a number of sealing units according to the refinement shown in FIG. 11 in an arrangement according to FIG. 2 in a modified assembly arrangement.

In a sectional view corresponding to the representation according to FIG. 2, FIG. 12 shows a number of sealing units 115 according to the refinement explained with reference to FIG. 11 in an assembled arrangement, wherein to avoid repetitions elements corresponding to one another in the representation according to FIG. 2 and the representation according to FIG. 12 are provided with the same reference signs and are partially not explained in more detail hereinafter. The illustration according to FIG. 12 shows that the sealing units 115 are connected via a number of individual ring fastening screws 1203 to the sealing ring carrier 112 for the axially inner sealing unit 115 arranged on the right in the representation according to FIG. 12 or to the respective axially inner adjacent sealing unit 115 for axially outer sealing units 115. The sealing unit 115 on the very outside in the axial direction is detachably connected by means of locking screws 1206 to a clamping ring 230 that is dimensioned smaller in the radial direction than the clamping ring 230 according to FIG. 2, which is adjoined by a closing ring 1209 essentially completely overlapping the opening between the sealing ring carrier 112 and the seal wear ring 106 in the axial outside region.

The closing ring 1209 is connected to the sealing ring carrier 112 by means of closing ring fastening screws 1212 with the seal carrier 112, so that the sealing units 115 are once again fixed in the composite. The closing ring 1209 is itself covered axially on the outside by a cover ring 1215 for protection.

It can also be seen from FIG. 12 that the sealing unit 115 adjoining the stop ring 221 creates a radial seal with respect to the adjacent sealing unit 115 by means of a radial edge sealing ring 1218 arranged in the sealing ring holder 118.

Figure 13:
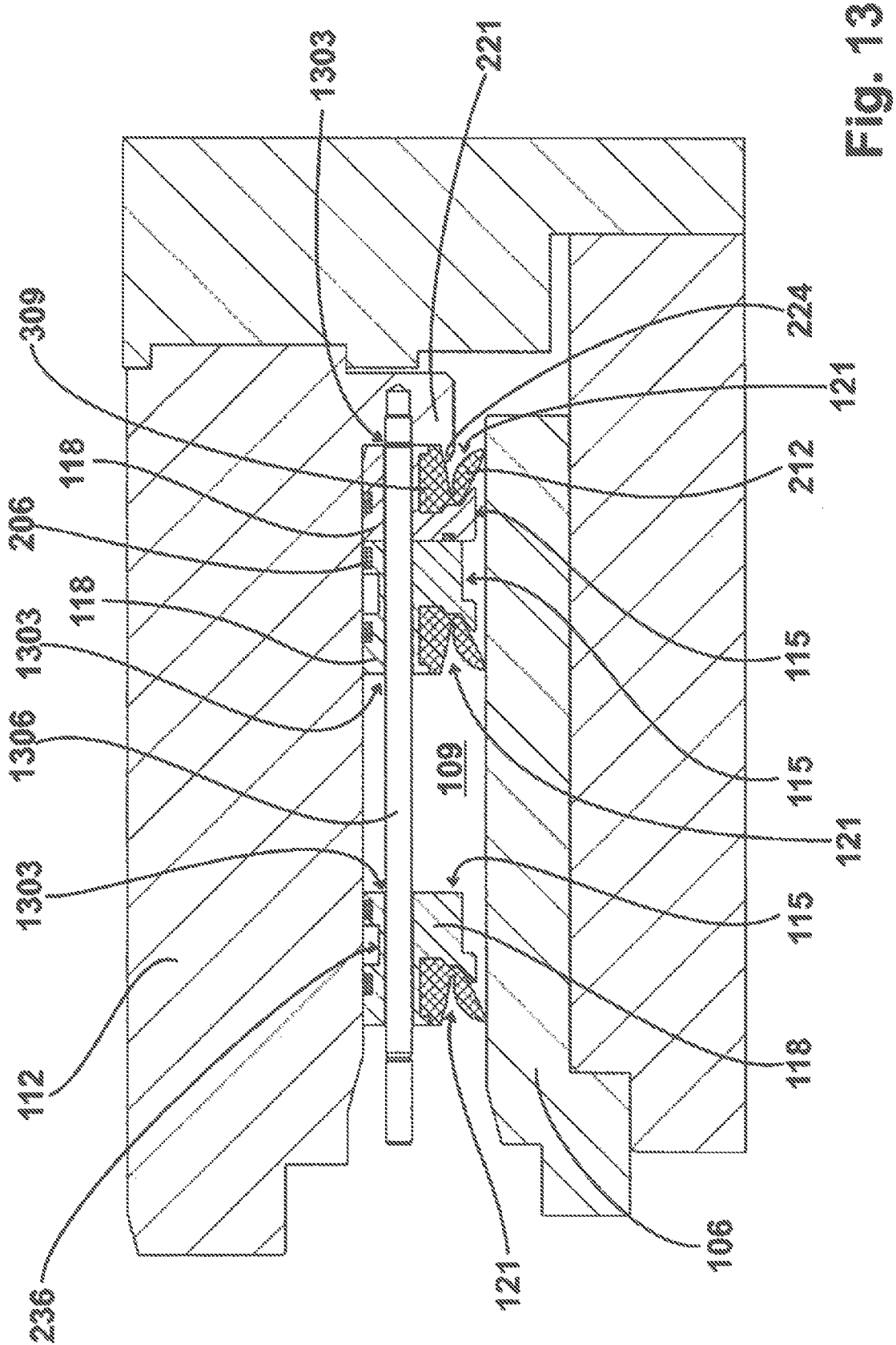
FIG. 13 shows, in a sectional view, an intermediate state during assembly of individual sealing units by means of a number of block assembly bolts.

In a sectional view corresponding to the representation according to FIG. 12, FIG. 13 shows a number of sealing units 115 in a modified refinement according to FIG. 11, wherein to avoid repetitions elements corresponding to one another in the representation according to FIG. 12 and the representation according to FIG. 13 are provided with the same reference signs and are partially not explained in more detail hereinafter. In the embodiment according to FIG. 13, first through openings 1303 are formed in the sealing ring holders 118 and extend in the axial direction and cross the respective sealing ring holder 118. Furthermore, it can be seen from the illustration according to FIG. 13 that a number of block mounting bolts 1306 are present, which are screwed into the stop ring 221 at one end and which extend away from the stop ring 221 in the axial direction.

As can be seen from FIG. 13, the sealing units 115 can be pushed onto the block assembly bolts 1306 axially on the outside and pushed up to the stop onto the stop ring 221 or onto the sealing unit 115 lying axially on the inside. If the block assembly bolts 1306 are dimensioned sufficiently large, the sealing units 115 can thus be fixed to one another without individual screw connections.

Figure 14:
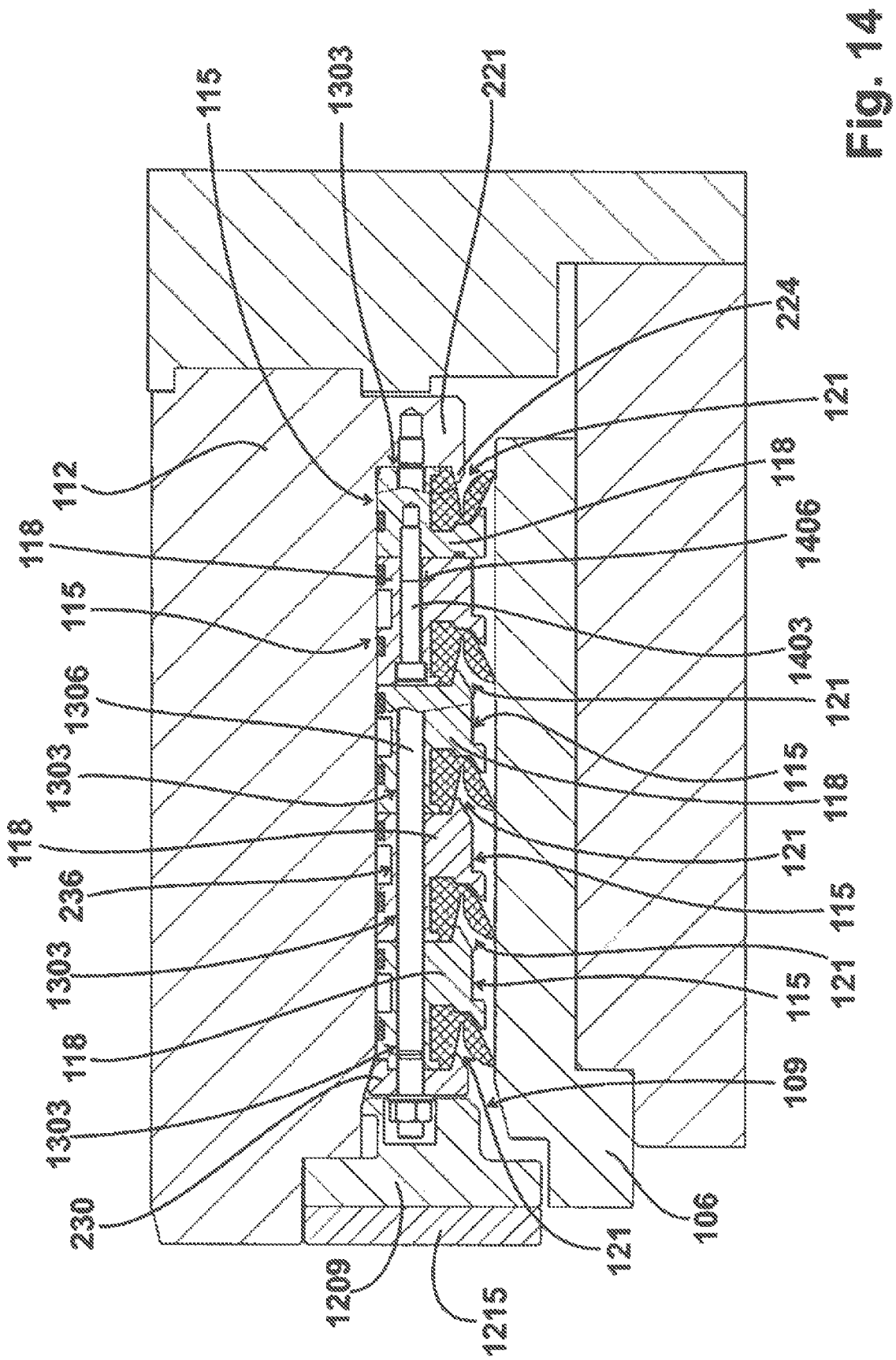
FIG. 14 shows, in a sectional view, a final assembly arrangement of sealing units which are held using individual fastening screws and block assembly bolts.

In a sectional view corresponding to the representation according to FIG. 12 and FIG. 13, FIG. 14 shows a refinement of the embodiment according to FIG. 13, wherein to avoid repetitions elements corresponding to one another in the representations according to FIG. 13 and FIG. 14 are provided with the same reference signs and are partially not explained in more detail hereinafter. From the illustration according to FIG. 14 it can be seen that, in comparison to the embodiment according to FIG. 13, to increase the stability of the group of sealing units 115, in addition to the block mounting bolts 1306, individual mounting bolts 1403 are provided, which extend through second through holes 1406, which are formed in the seal ring holders 118 and are offset in relation to the first through holes 1303 for the block mounting bolts 1306, and to which sealing ring holders 118 adjacent in the axial direction can be screwed, to thus also directly connect adjacent seal ring holders 118 in pairs to increase the stability of the combination of sealing units 115.

Figure 15:
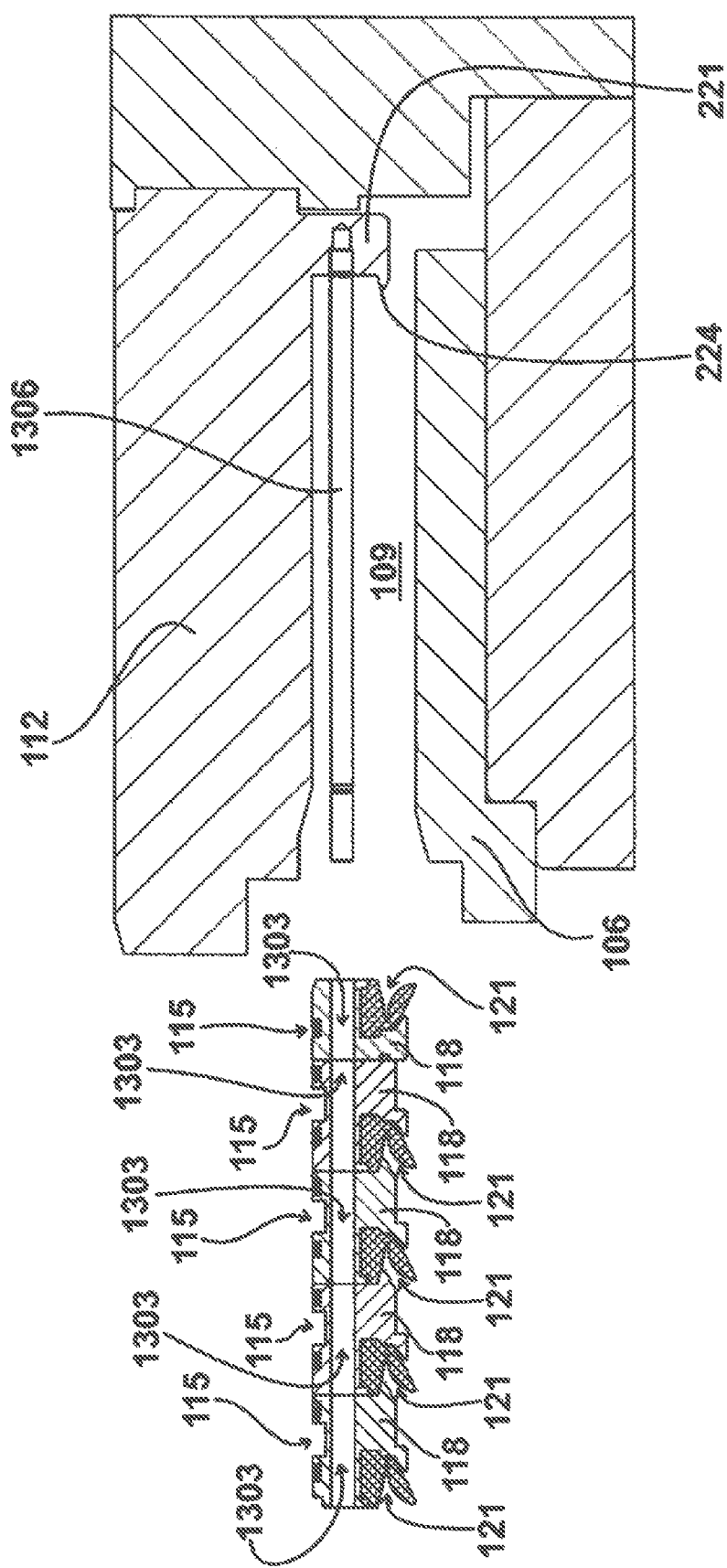
FIG. 15 shows, in a sectional view, a block of sealing units connected to one another before a final assembly before being pushed onto block assembly bolts.

FIG. 15 shows a sectional view of the embodiment of sealing units 115 explained with reference to FIG. 14 having the two sets of through holes 1303, 1406 with the sealing units 115 in a pre-assembly arrangement, in which the sealing units 115 are already screwed together via the individual assembly bolts 1403 to form a mounting block and are prepared to be pushed onto the block mounting bolts 1306. This results in a particularly efficient pre-assembly of the sealing units 115 outside of the annular gap 109 formed between the seal wear ring 106 and the seal carrier 112.

In expedient embodiments of tunnel boring machines according to the invention, annular leak testing tools are provided, which are explained in more detail below.

Figure 16:
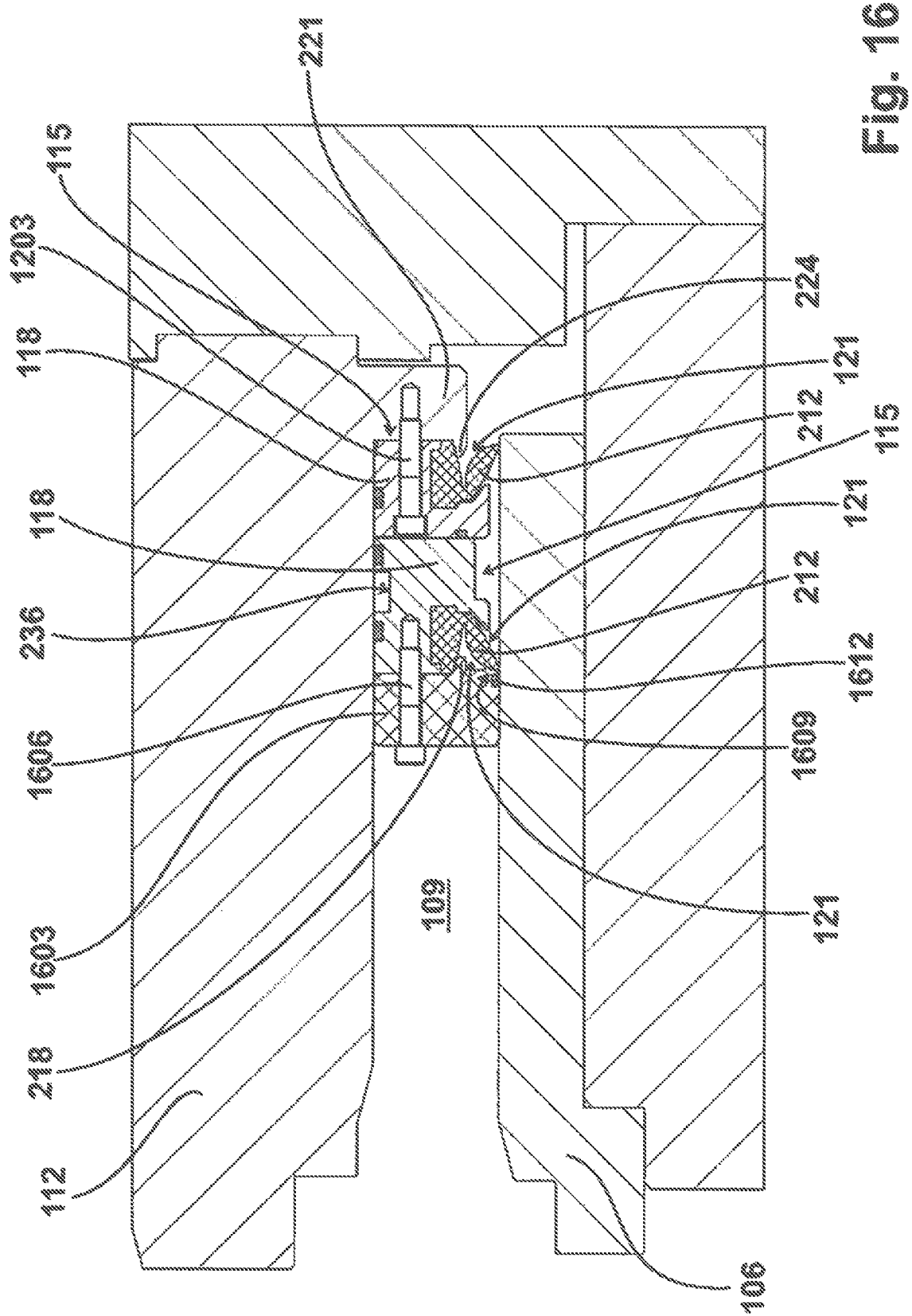
FIG. 16 shows, in a sectional view, two sealing units in an intermediate assembly arrangement and a hold-down tool for carrying out a pressure test.

In a sectional view corresponding to FIG. 11, FIG. 16 shows an annular hold-down tool 1603 as an exemplary embodiment of a leak testing tool, which is arranged in the annular gap 109 and screwed by means of tool fastening screws 1606 onto a sealing ring holder 118 located axially on the outside for leak testing. The end face of the hold-down tool 1603 facing toward the sealing unit 115 is formed having a counter lug 218 in the region of the fixing region 209 of the sealing ring 121, like the corresponding region of a sealing ring holder 118, but unlike such a sealing ring holder 118, it has a sealing lip stop 1609 on its side adjoining the sealing wear ring 106, using which the sealing lip 212 adjoining it is fixable against movement. Furthermore, the illustration according to FIG. 16 shows that in the region of the sealing lip stop 1609 there is a tool seal 1612 that seals in the axial direction.

In the arrangement shown in FIG. 16, the opening pressure of the sealing unit 115 arranged axially on the inside and connected to the stop ring 221 can be checked by applying a pressurized fluid such as compressed air to the passage arrangement 236 formed in the sealing unit 115 adjoining the hold-down tool 1603.

Figure 17:
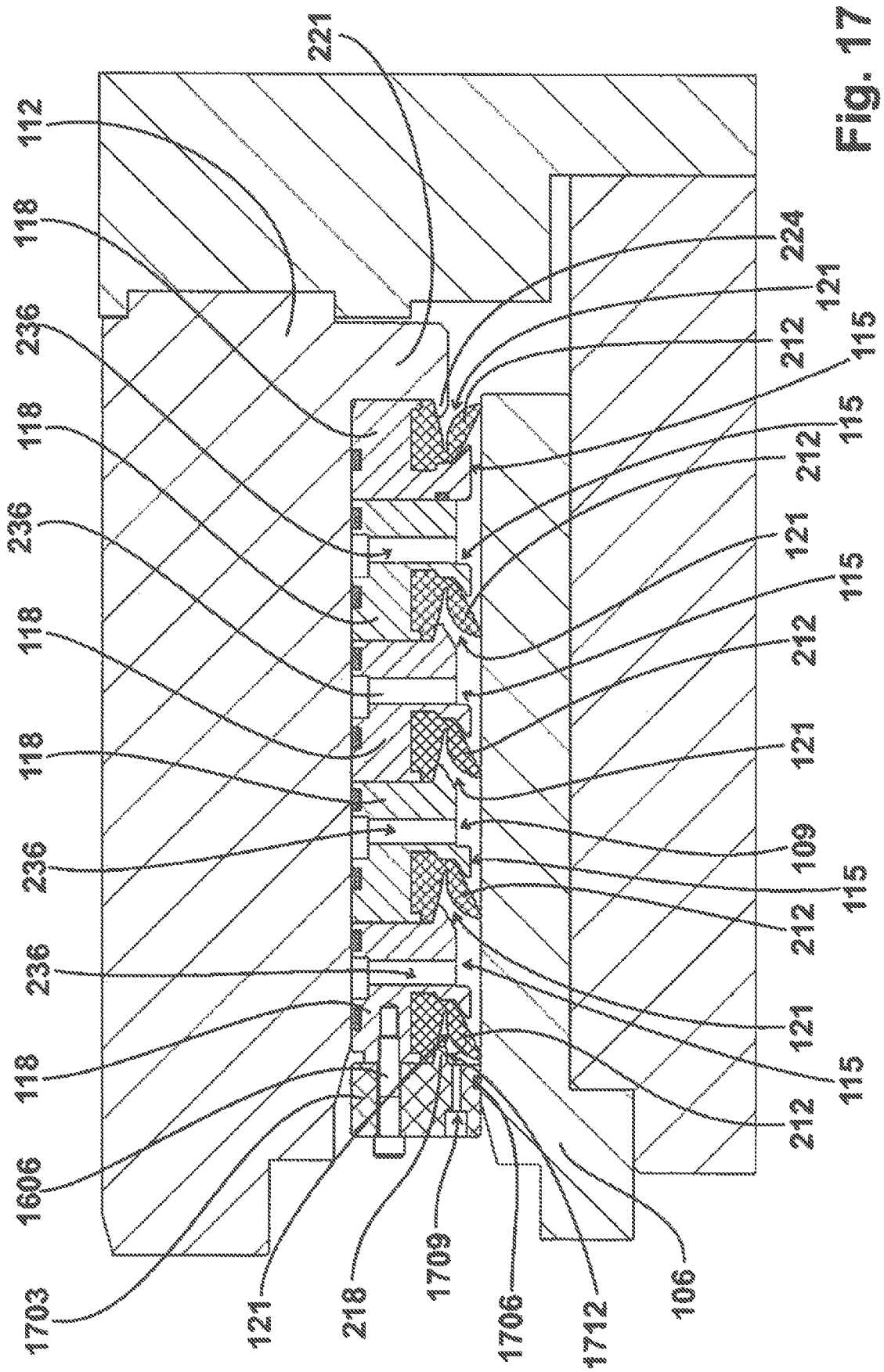
FIG. 17 shows, in a sectional view, a number of fully assembled sealing units and an pressure tool for carrying out a pressure test.

In a sectional view corresponding to FIG. 12, FIG. 17 shows an arrangement of sealing units 115 arranged in the annular gap 109 having an pressure tool 1703 as a further annular leak testing tool. Like the hold-down tool 1603, the pressure tool 1703 is screwed using tool fastening screws 1606 onto a sealing ring holder 118 lying on the axial outside of a sealing unit 115 and is configured having a counter lug 218 in the region of the fixing region 318 of the sealing ring 121 to reach behind the fixing region 318.

In contrast to the hold-down tool 1603, the region of the pressure tool 1703 adjacent to the seal wear ring 106 is spaced apart in the axial direction from the free end of the sealing lip 212 adjacent to it, so that this sealing lip 212 is movable to a certain extent. The pressure tool 1703 is also sealed in the axial direction via an pressure tool seal 1706 adjoining the seal wear ring 106.

The pressure tool 1703 is formed having a pressure inlet opening 1709, which extends in the axial direction through the pressure tool 1703 and via which a pressurized fluid can be fed into the annular test space 1712 formed between the sealing ring 121 arranged axially on the inside and the pressure tool 1703. As a result, the closing pressure, also known as the functional pressure, of the sealing ring 121 adjacent to the pressure tool 1703 can be checked.

Since each sealing unit 115 is also formed having a passage arrangement 236, an pressure tool 1703 arranged axially on the outside of the sealing unit 115 installed last or installed axially on the very outside and thus at the end can be used to check various pressure constellations as to whether the required closing pressures and opening pressures of the last installed sealing unit 115 or the already installed combination of sealing units 115 are complied with.

Figure 18:
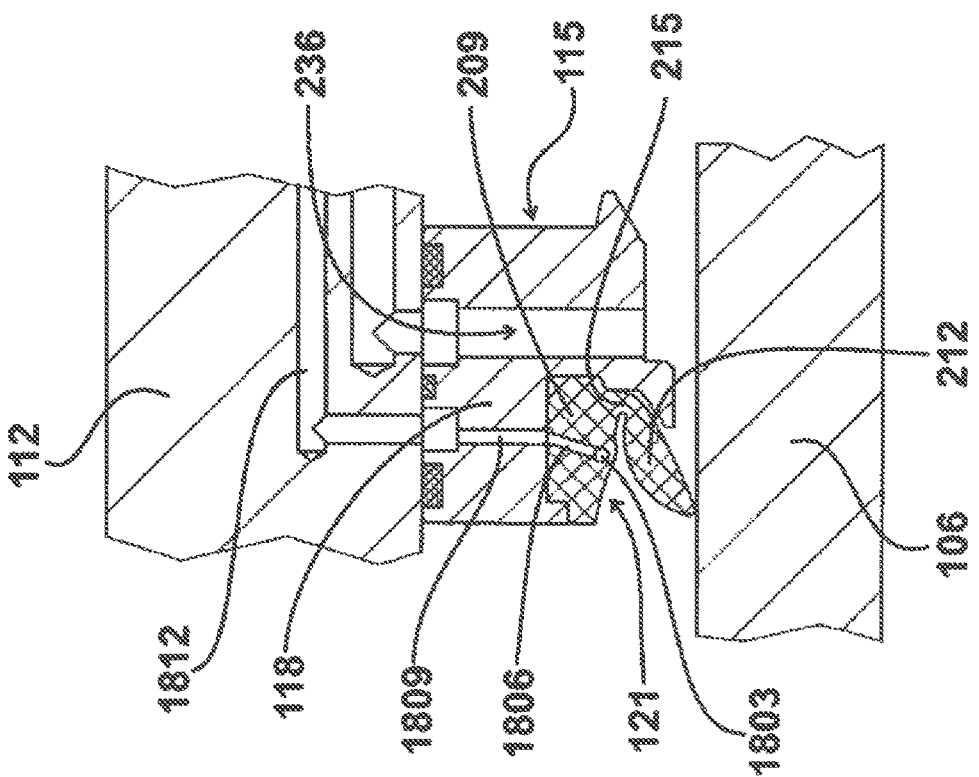

FIG. 18 shows a sectional view of a refinement of a sealing unit 115 in which the sealing ring 121 is formed in its fixing region 209, expediently having a relatively small residual material thickness in the region opposite to the sealing lip 212, having an annular hollow chamber 1803 extending in the circumferential direction. The annular hollow chamber 1803 is fluid-dynamically connected to an outside of the fixing region 209 via a number of connecting channels 1806. The connecting channels 1806 are adjoined by passage channels 1809 formed in the sealing ring holder 118, which in turn are connected to fluid channels 1812 formed in the seal carrier 112.

The fluid-mechanical combination of annular hollow chamber 1803, connecting channels 1806, passage channels 1809, and fluid channels 1812 of or for a sealing unit 115 are filled using a fluid, expediently using an incompressible or essentially incompressible liquid, to influence the movement behavior of the sealing lip 212 in question or the position of the sealing lip 212.

FIG. 18 shows the above-mentioned fluid-mechanical system in an unpressurized arrangement, in which the annular hollow chamber 1803 has a relatively small idle volume.

Figure 19:
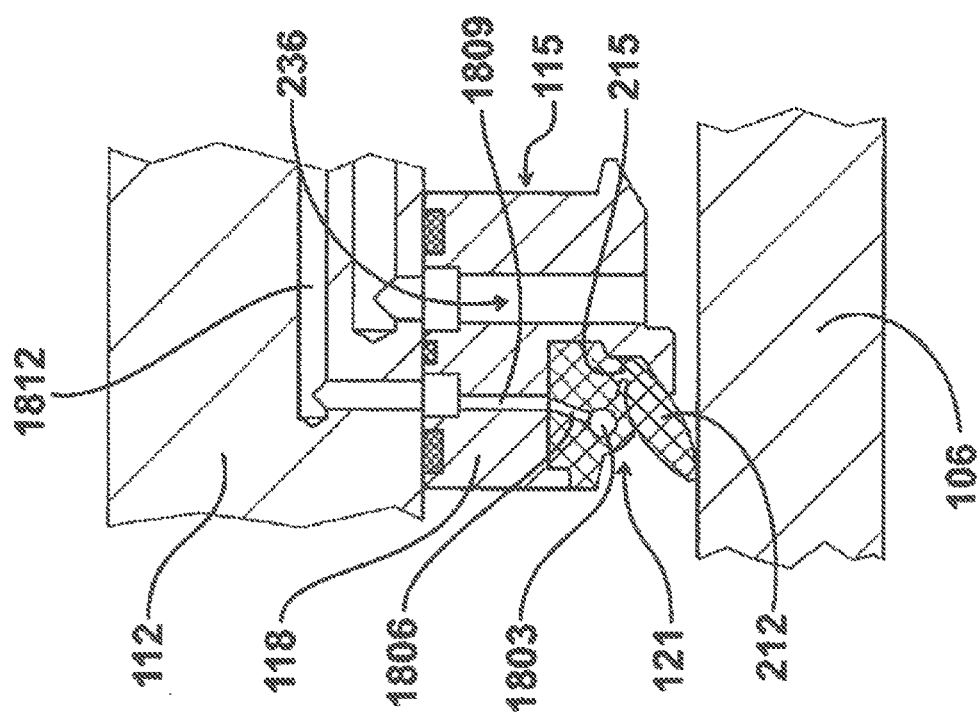
FIGS. 18 and 19 show a refinement of a sealing ring having an internal annular hollow chamber in a pressure-free state and in a pressurized state.

FIG. 19 shows the arrangement according to FIG. 18 having the pressurized fluid-mechanical combination of annular hollow chamber 1803, connecting channels 1806, passage channels 1809, and fluid channels 1812, in which the volume of the annular hollow chamber 1803 is increased as the working volume in comparison to the idle volume shown in FIG. 18 such that the region of the fixing region 209 opposite to the sealing lip 212 bulges protruding toward the sealing lip 212 and presses against the sealing lip 212 in the representation according to FIG. 19.

Depending on the pressures prevailing in the above-mentioned combination, the closing pressure or the opening pressure can thus be checked.

Furthermore, the sealing lip 212 can be limited or inhibited in order to relieve the joint region 215 when a corresponding pressure is applied in the above-mentioned combination.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

The invention claimed is:

1. A tunnel boring machine having
a driveshaft (103) for a cutting wheel, which is enclosed by a sealing wear ring (106) and by a seal carrier (112) arranged at a radial distance from the sealing wear ring (106) while forming an annular gap (109), and having a number of sealing units (115), which are arranged in succession in a sealing manner in the axial direction in the annular gap (109), wherein the sealing units (115) have a sealing ring holder (118) made of a rigid material, which is U-shaped in at least one receptacle region having two opposite side walls (303, 306; 703, 706; 903, 906) and having a radial outside top wall (309; 709; 803, 806; 909) extending between radial outside ends of the side walls (303, 306; 703, 706; 903, 906), and having a sealing ring (121) made of a flexible material, which has a fixing region (209) and at least one sealing lip (212), wherein the sealing ring holder (118) is constructed in two parts having a first sealing ring holder part (803; 912) and having a second sealing ring holder part (806; 915), and in that the sealing ring holder parts (803, 806; 912, 915) are releasably connectable to one another via connecting means (809, 918), wherein the fixing region (209) is enclosed by the side walls (303, 306; 703, 706; 903, 906) and by the top wall (309; 709; 803, 806; 909) of the sealing ring holder (118), so that each of these sealing units (115) is insertable into the annular gap (109) while the connecting means (809, 918) locks the sealing ring holder parts (803, 806; 912, 915) together without risk of tilting of the sealing ring, wherein a force flow takes place via the sealing ring holders (118) pressing against one another in the axial direction, so that due to the displaceability of the seal ring holders (118) in the axial direction taking place substantially without frictional losses, pre-tensions forces are distributed uniformly over the sealing ring holders (118) and each sealing ring holder (118) absorbs loads exerted on the sealing ring (121) held by it, so that loads on the fixing region (209) of the sealing rings (121) are less than loads exerted on the sealing ring holder (118).

2. The tunnel boring machine as claimed in claim 1, wherein the sealing ring holder (118) and the fixing region (209) have structures (312, 315; 318; 403; 603) which interlock alternately in a form-fitting manner.

3. The tunnel boring machine as claimed in claim 1, wherein the connecting means comprise screw connections (809).

4. The tunnel boring machine as claimed in claim 1, wherein the connecting means comprise at least one detent connection (918).

5. A tunnel boring machine having a driveshaft (103) for a cutting wheel, which is enclosed by a sealing wear ring (106) and by a seal carrier (112) arranged at a radial distance from the sealing wear ring (106) while forming an annular gap (109), and having a number of sealing units (115), which are arranged in succession in a sealing manner in the axial direction in the annular gap (109), wherein the sealing units (115) have a one-piece sealing ring holder (118) made of a rigid material, which is U-shaped in at least one receptacle region having two opposite side walls (303, 306; 703, 706; 903, 906) and having a radial outside top wall (309; 709; 803, 806; 909) extending between radial outside ends of the side walls (303, 306; 703, 706; 903, 906), and having a sealing ring (121) made of a flexible material, which has a fixing region (209) and at least one sealing lip (212), wherein the fixing region (209) is enclosed by the side walls (303, 306; 703, 706; 903, 906) and by the top wall (309; 709; 803, 806; 909) of the sealing ring holder (118), so that each of these sealing units (115) is insertable into the annular gap (109) without risk of tilting of the sealing ring, wherein a force flow takes place via the sealing ring holders (118) pressing against one another in the axial direction, so that due to the displaceability of the seal ring holders (118) in the axial direction taking place substantially without frictional losses, pre-tensions forces are distributed uniformly over the sealing ring holders (118) and each sealing ring holder (118) absorbs loads exerted on the sealing ring (121) held by it, so that loads on the fixing region (209) of the sealing rings (121) are less than loads exerted on the sealing ring holder (118).

6. The tunnel boring machine as claimed in claim 5, wherein the or each sealing ring (121), in a relaxed arrangement in the axial direction, has an excess (1103) in relation to an end face (1106) of the sealing ring holder (118) holding the sealing ring (121).

7. The tunnel boring machine as claimed in claim 5, wherein the or each sealing ring (121) has an annular hollow chamber (1803) which is fluid-mechanically connected to the outside of the sealing ring (121) via at least one connecting channel (1806).

8. The tunnel boring machine as claimed in claim 7, wherein the sealing ring holder (118) has a through channel (1809) which extends through the sealing ring holder (118) and is in fluid-mechanical connection with the connecting channel (1806).

9. The tunnel boring machine as recited in claim 7, wherein the fixing region is expanded into engagement with the sealing lip to press the sealing lip against the sealing wear ring in response to supplying pressurized fluid to the annular hollow chamber.

10. The tunnel boring machine as claimed in claim 5, wherein the sealing ring (121) between the fixing region (209) and the or each sealing lip (212) has a joint region (215) having a material thickness that is reduced in comparison to the sealing lip (212).

11. The tunnel boring machine as claimed in claim 5, wherein the fixing region (209) is arranged having a pre-tension in the sealing ring holder (118).

12. The tunnel boring machine as claimed in claim 5, wherein the side walls (903, 906) are inclined towards one another, pointing away from the top wall (909).

13. The tunnel boring machine as claimed in claim 5, wherein a passage arrangement (236) is formed in the sealing ring holders (118), which is configured, in dependence on the axial position of the passage arrangement (236) along the annual gap (109) after completion of an installation process, to supply a chamber with supplied grease, oil, or corresponding media or to supply a pressurized fluid to carry out leak tests.

14. The tunnel boring machine as claimed in claim 13, wherein a wedge-like centering aid (1003) is arranged at an insertion end of the annular gap (109).

15. The tunnel boring machine as claimed in claim 5, wherein there are a number of block assembly bolts (1306) and/or individual assembly bolts (1403), via which a number of sealing units (115) can be assembled in blocks and/or individually.

16. The tunnel boring machine as claimed in claim 5, wherein there is at least one annular leak test tool (1603, 1703) which can be connected in a pressure-tight manner to the sealing units (115) arranged axially on the outside.

17. The tunnel boring machine as claimed in claim 5, wherein at least one of the sealing ring holders associated with one of the sealing rings includes a counter lug that extends into engagement with the fixing region of an adjacent sealing ring.

18. The tunnel boring machine as claimed in claim 5, wherein a stop lug extending from one side wall towards the other side wall for limiting deflection of the sealing lip away from the fixing region in response to pressure applied to a volume formed between the fixing region and the sealing lip.

* * * * *